J. D. MAXWELL.
DRIVE AXLE.
APPLICATION FILED SEPT. 13, 1907.
994,019.
Patented May 30, 1911.
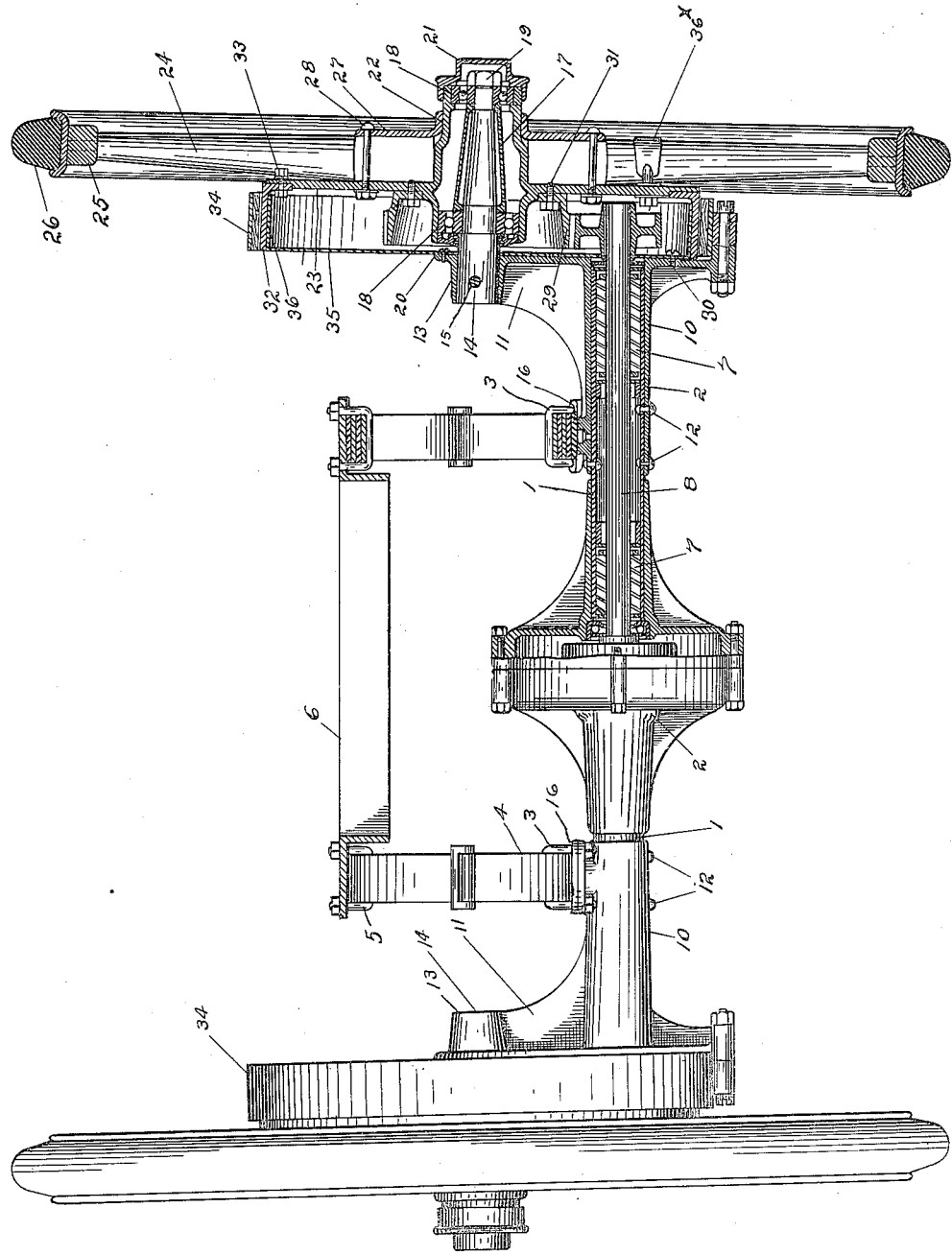
WITNESSES:
Walter A. Greenburg
C. R. Stickney
INVENTOR:
JONATHAN D. MAXWELL.
BY 
ATTORNEYS.

UNITED STATES PATENT OFFICE.

JONATHAN D. MAXWELL, OF TARRYTOWN, NEW YORK.

DRIVE-AXLE.

994,019.  Specification of Letters Patent.  Patented May 30, 1911.

Application filed September 13, 1907. Serial No. 392,629.

*To all whom it may concern:*

Be it known that I, JONATHAN D. MAXWELL, a citizen of the United States of America, residing at Tarrytown, in the county of Westchester and State of New York, have invented certain new and useful Improvements in Drive-Axles, of which the following is a specification, reference being had therein to the accompanying drawings.

In automobiles designed for trucking, for heavy commercial usage, or for other purposes where it is desirable to replace the ordinary pneumatic tires of the traction wheels with solid or cushion tires, it is advisable to compensate for this loss of resiliency by increasing the diameter of the wheels beyond the usual size, whereby they roll over rough roads with greater facility and smoothness. At the same time it is necessary that the frame of the vehicle be kept as low as possible for readiness in loading or to permit a cab body or the like to be mounted thereon.

This invention relates to a rear axle equipment for automobiles which incorporates the desirable features above noted as well as provides certain other advantages in the transmission mechanism, notably in the carrying of the torsional strain well out of the wheel fellies and in the shielding of the wearing surfaces of the mechanism from dirt.

The invention consists in the matters hereinafter set forth, and more particularly pointed out in the appended claims.

Referring to the drawings, the figure is a view in rear elevation partially in section and partially in elevation of traction wheels and rear drive axle embodying features of the invention.

The main shaft, as shown in the drawings, is of the standard type in so far as it comprises tubular outer sleeves 1 secured to the outer casing 2 of a shaft drive compensating gear of any approved type, the sleeves and casing constituting the stationary member of the axle and affording support through suitable clips 3, springs 4 and bolsters 5 for a frame 6, and having internal conventional roller bearings 7 in which the sections 8 of the drive shaft proper are journaled and are coupled to the compensating gear as usual.

The outer end of each sleeve extends through a tubular arm 10 of a drop bracket 11 in which it is secured by properly disposed rivets 12 or the like. Each bracket which is suitably ribbed and flanged to combine strength and lightness, has a hollow lug 13 at its upper end in which an outwardly extending stud 14 is secured as by a pin 15 or the like, in the vertical axial plane of the main shaft preferably at a slight angle to the horizontal plane to give the customary rake to the wheels. A seat 16 for the spring clip 3 with suitable bolt apertures may be formed on the inner end of the bracket arm, if desired. A thimble 17, ball-bearings 18, bur 19 and dust ring 20 and cap 21 of the usual design rotatably engage and secure a wheel hub 22 on the stud.

An annular flange 23 is integrally formed on the hub, and spokes 24 carrying a felly 25 and tire 26 are clamped thereon by an outer collar 27 and bolts 28, the navel of the wheel being built up in the usual manner.

A gear 29 on the inner end of the wheel hub meshes with a pinion 30 on the extended end of the shaft section 8. The gear is preferably annular and secured directly against the inner face of the hub flange by bolts 31 or the like. A rim 32 is formed on or secured to the outer margin of the hub flange as by bolts 33 or the like, and serves both as a housing for the gear and pinion and as a brake drum for an external brake shoe or strap 34 applied in the usual manner. A disk 35 secured on the bracket having a peripheral flange 36 which is rotatable in the rim 32, completes the housing of the gears, the flange extending well into the drum for a dust proof joint. Clips 36<sup>x</sup> bolted to the hub flange near its rim encircle a number of the wheel spokes and transmit the torsional strain to them near the felly. This latter feature of construction permits the proportions of a bearing wheel to be closely followed, even with a greatly increased diameter instead of the more cumbersome design required for a traction wheel which has to transmit the driving torque direct from the hub to the felly.

Another feature is the use of an external gear and pinion so that any dust that works in is not picked up as by the teeth as is frequent with the internal gears in use on the straight axle. The chief feature is the disposition of the brackets so that any diameter of drive wheel may be used to meet any desired condition of service while the body frame is not necessarily changed from the normal, the axle presenting the rigidity of a straight shaft and the gearing being even more efficient as it does away with internal gears and houses all wearing surfaces.

Obviously the design and details of construction may be varied without departing from the spirit of the invention and I do not care to limit myself to any particular form or arrangement of parts.

What I claim as my invention is:—

1. The combination with a tubular transverse member provided with an intermediately situated differential gear case and with a driving shaft revolubly mounted therein, of brackets affixed to the outer ends of said transverse member and extending upwardly therefrom and studs secured in the upper ends of said brackets and upon which the traction wheels are journaled, said brackets formed with inwardly projecting upper and lower tubular arms, the inner ends of the studs being secured in the upper ones and the outer ends of the transverse member being secured in the lower ones, said lower arms projecting inwardly into juxtaposition with the gear casing and forming supports for the vehicle body.

2. The combination with a transverse member provided with an intermediately situated differential gear case and with a driving shaft revolubly mounted therein, of brackets at the outer ends thereof having inwardly projecting upper and lower tubular arms, the ends of the transverse member being secured in the lower arms, outwardly projecting studs secured with their inner ends in the upper tubular arms, traction wheels journaled upon said studs, and gear and pinion drive mechanism between the ends of the driving shaft and the hubs of the traction wheels, said hubs provided upon their inner ends with enlarged spoke flanges provided with brake rims and the brackets provided with flanged disks forming in connection therewith a gear casing for the driving mechanism.

In testimony whereof I affix my signature in presence of two witnesses.

JONATHAN D. MAXWELL.

Witnesses:
J. T. CONNELL,
JAS. P. ROOME.